United States Patent [19]
Bar-on

[11] 4,000,394
[45] Dec. 28, 1976

[54] FUSER THERMAL DETECTOR

[75] Inventor: Ari Bar-on, Rochester, N.Y.

[73] Assignee: Xerox Corporation, Stamford, Conn.

[22] Filed: Aug. 28, 1975

[21] Appl. No.: 608,610

[52] U.S. Cl. .............................. 219/216; 219/469; 338/22 R
[51] Int. Cl.² ......................................... H05B 1/00
[58] Field of Search .................. 219/216, 469–471; 338/22, 25, 28; 100/43 RP; 432/60, 228

[56] References Cited
UNITED STATES PATENTS 3,809,855 5/1974 Neal ................................. 219/471

OTHER PUBLICATIONS

D. N. Neal & G. C. Greuling *Moving Surface Temperature Sensor* "IBM Technical Disclosure Bulletin," vol. 14, No. 6, Nov. 1971.

*Primary Examiner*—C. L. Albritton
*Attorney, Agent, or Firm*—H. Fleischer; J. J. Ralabate; C. A. Green

[57] ABSTRACT

An apparatus in which heat settable particles are affixed substantially permanently to a sheet. The apparatus includes a heated fuser member cooperating with a backup member to define a nip through which the sheet passes. A detector is in contact with the heated fuser member to measure the temperature thereof. The detector is supported so as to be universally pivotable.

4 Claims, 4 Drawing Figures

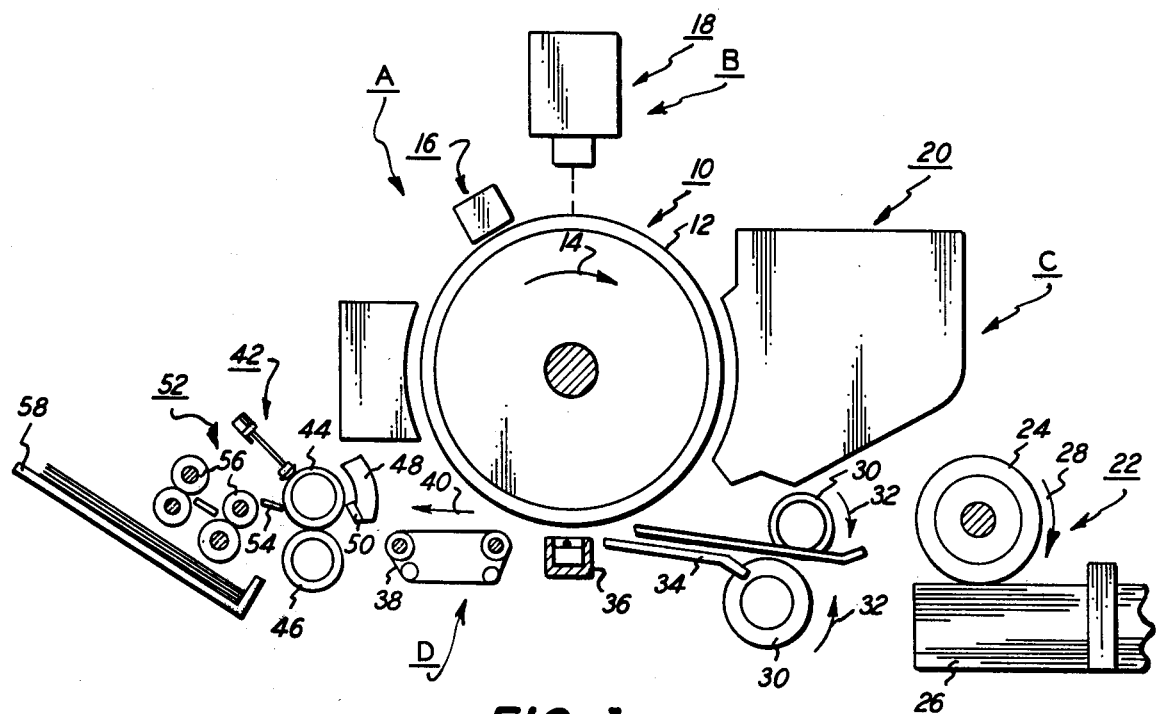
FIG. 1
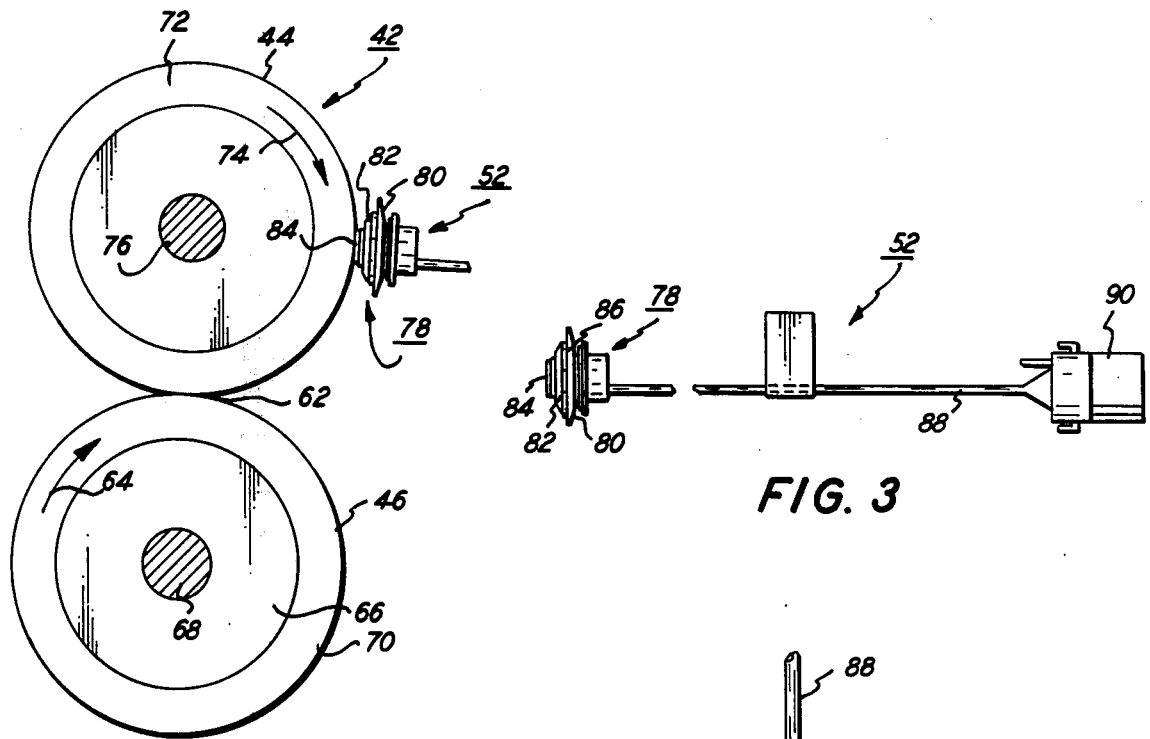
FIG. 2
FIG. 3
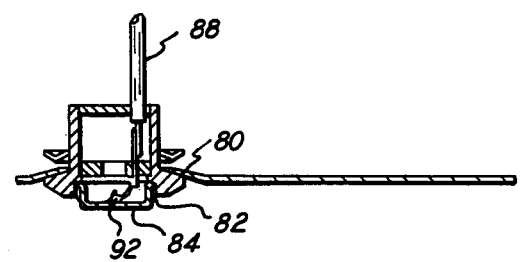
FIG. 4

FUSER THERMAL DETECTOR

BACKGROUND OF THE INVENTION

This invention relates to an electrostatographic printing machine, and more particularly concerns an apparatus for permanently affixing heat settable particles to a sheet.

In a typical electrostatographic printing machine, a latent image recorded on a surface is developed with heat settable charged particles. The particles are transferred to the sheet in image configuration. Thereafter, the particles are permanently affixed to the sheet forming a permanent copy of the original document. Both electrophotographic and electrographic printing are types of electrostatographic printing. Electrophotographic printing charges a photoconductive member to a substantially uniform level. A light image of an original document irradiates a charged photoconductive member to dissipate the charge to record thereon an electrostatic latent image. Electrographic printing does not employ a photoconductive member, nor a light image of the original document to create a latent image. However, both of these processes generally employ heat settable particles. The particles are permanently affixed to the sheet of support material by the application of heat thereto. Hereinafter, electrophotographic printing will be discussed as an exemplary printing process employing the features of the present invention therein.

Various techniques have been devised for applying heat to the particles transferred to the sheet of support material. One approach passes the sheet of support material through a radiant oven which applies sufficient heat to permanently fuse the toner particles to the sheet. An alternate approach utilizes rollers through which the sheet of support material passes. One or both of these rollers may be heated.

In fusing systems of the foregoing type, it is highly desirable to control the temperature. Various prior art devices have been developed to measure the temperature of the fuser roll. Exemplary of these is U.S. Pat. No. 3,690,176 issued in 1972 to Connolly et al.. As described therein, a thermistor, mounted pivotably about two axes, contacts a heated fuser roll.

Accordingly, it is the primary object of the present invention to improve temperature sensing of heated roll fusers.

BRIEF SUMMARY OF THE INVENTION

Briefly stated, and in accordance with the present invention, there is provided an apparatus for permanently affixing heat settable particles to a sheet.

Pursuant to the features of the present invention, the apparatus includes a backup member cooperating with a fuser member to define a nip therebetween. The sheet, with the heat settable particles thereon, passes through the nip. Means are provided for heating at least the fuser member to a temperature sufficient to permanently affix the particles to the sheet. Detecting means, in contact with the fuser member, measure the temperature of the fuser roll. Means support the detecting means pivotably in any direction.

BRIEF DESCRIPTION OF THE DRAWINGS

Other objects and advantages of the present invention will become apparent upon reading the following detailed description and upon reference to the drawings, in which:

FIG. 1 is a schematic elevational view depicting an electrophotographic printing machine incorporating the features of the present invention therein;

FIG. 2 is a schematic elevational view illustrating the fuser of the FIG. 1 printing machine;

FIG. 3 is an elevational view of the temperature sensor employed in the FIG. 2 fuser; and FIG. 4 is a sectional view of the FIG. 3 temperature sensor.

While the present invention will be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

For a general understanding of an electrophotographic printing machine in which the present invention may be incorporated, reference is had to FIG. 1 which depicts schematically the various components thereof. In the drawings, like reference numerals have been employed throughout to designate like elements. Although the apparatus for detecting the fuser roll temperature is particularly well adapted for use in the FIG. 1 electrophotographic printing machine, it will become evident from the following discussion that it is equally well suited for use in a wide variety of devices and is not necessarily limited in its application to the particular embodiment shown herein.

Inasmuch as the practice of electrophotographic printing is well known in the art, the various processing stations for producing a copy of an original document are represented in FIG. 1 schematically by the reference letters A through F, inclusive.

An electrophotographic printing machine employs a drum 10 having a photoconductive surface 12 entrained about and secured to the exterior circumferential surface thereof. Drum 10 is rotated in the direction of arrow 14 to pass through the various processing stations located about its periphery. A suitable photoconductive material may be a selenium alloy of the type described in U.S. Pat. No. 2,970,906 issued to Bixby in 1961.

Drum 10 initially rotates photoconductive surface 12 through charging station A. A corona generating device, indicated generally by the reference numeral 16, is positioned at charging station A. Corona generating device 16 is located closely adjacent to photoconductive surface 12. When energized, corona generating device 16 charges a portion of photoconductive surface 12 to a relatively high substantially uniform potential. One type of suitable corona generating device is described in U.S. Pat. No. 2,836,725 issued to Vyverberg in 1958.

The charged portion of photoconductive surface 12 is next rotated to exposure station B. Exposure station B includes an exposure mechanism, indicated generally by the reference numeral 18. Exposure mechanism 18 includes the stationary housing. The housing comprises a transparent platen, such as glass plate or the like, having an original document disposed thereon. Lamps illuminate the original document. Scanning of the original document is achieved by oscillating a mirror in a timed relationship with the movement of drum 10, or by translating the lamp and lens system across the original document to create successive incremental light images thereof which are projected, in a timed relationship, onto the charged portion of photoconductive surface 12. Thus, the light image of the original document is reflected through the lens onto a mirror which, in turn, transmits the light image through a slit onto the charged portion of photoconductive surface 12. Irradiation of the charged photoconductive surface dissipates the charge thereon recording an electrostatic latent image corresponding to the original document.

After the electrostatic latent image is recorded on photoconductive surface 12, drum 10 rotates to development station C. At development station C, a developer unit 20 brings a developer mix of carrier granules and toner particles into contact with the electrostatic latent image. The developer unit includes a housing having a supply of developer mix therein. The carrier granules are formed from a magnetic material with the toner particles being a heat settable plastic. Preferably, developer unit 20 is a magnetic brush development system. In a system of this type, the developer mix is brought through a directional flux field forming a brush thereof. The brush of developer mix contacts the electrostatic latent image recorded on photoconductive surface 12. The latent image attracts electrostatically the toner particles from the carrier granules forming a toner powder image on photoconductive surface 12.

Referring now to the sheet feeding path, the sheet of support material is advanced by sheet feeding apparatus 22 to transfer station D. Sheet feeding apparatus 22 includes feed roll 24 in contact with the uppermost sheet of the stack 26 of sheets. Feed roll 24 rotates in the direction of arrow 28 advancing successive uppermost sheets from stack 26. Registration rolls 30, rotating in the direction of arrow 32, align and forward the advancing sheet into chute 34. Chute 34 directs the sheet into contact with photoconductive surface 12 in registration with the toner powder image formed thereon. Thus, the sheet of support material contacts the toner powder image at transfer station D.

A corona generating device, indicated generally by the reference numeral 36, is positioned at transfer station D. Corona generating device 36 applies a spray of ions onto the backside of the sheet of support material opposed from photoconductive surface 12. The toner powder image adhering to photoconductive surface 12 is attracted from the latent image to the sheet of support material. After transferring the toner powder image to the sheet of support material, endless belt conveyor 38 advances the sheet of support material in the direction of arrow 40 to fusing station E.

Fusing station E includes a fusing assembly indicated generally by the reference numeral 42. Fuser assembly 42 heats the transferred toner powder image to permanently affix it to the sheet of support material. A heated fuser member or roll, shown generally by the reference numeral 46, defines a nip through which the sheet of support material passes. The sheet of support material passes through the nip with the toner powder image thereon contacting fuser roll 44. Dispenser 48 periodically applies release material to fuser roll 44. Blade 50 adjusts the thickness of the release material coating fuser roll 44. A temperature detector, indicated generally by the reference numeral 52, contacts fuser roll 44 to measure the temperature thereof. Temperature detector 52 will be described hereinafter in greater detail with reference to FIGS. 2 through 4, inclusive. After the toner powder image is permanently affixed to the sheet of support material, stripper blade 54 insures that the sheet is separated from fuser roll 44. The sheet of support material is then advanced by a series of rollers 56 to catch tray 58 for subsequent removal therefrom by the machine operator.

Invariably, after the sheet of support material is separated from photoconductive surface 12, some residual toner particles adhere thereto. These residual toner particles are removed from photoconductive surface 12 at cleaning station F. Cleaning station F includes a cleaning mechanism, designated generally by the reference numeral 60, having a corona generating device and a brush. The brush contacts photoconductive surface 12. Initially, toner particles are brought under the influence of the corona generating device (not shown) to neutralize the remaining electrostatic charge on photoconductive surface 12 and that of the residual toner particles. The neutralized toner particles are cleaned from photoconductive surface 12 by a rotatably mounted fibrous brush (not shown).

After cleaning, a discharge lamp floods photoconductive surface 12 with light to dissipate any residual charge thereon. Thus, the charge on photoconductive surface 12 is returned to its initial level prior to recharging thereof.

It is believed that the foregoing description is sufficient for purposes of the present application to illustrate the general operation of an electrophotographic printing machine embodying the features of the present invention therein. Referring now to the specific subject matter of the present invention, FIG. 2 depicts the fusing system and the temperature detector associated therewith.

Fuser assembly 42 comprises a heated fuser roll 44 and a backup roll 46. Fuser roll 44 cooperates with backup 46 to form a nip 62 therebetween. A sheet of support material having a toner powder image thereon passes through nip 62. The sheet of support material is oriented to have the toner powder image thereon contacting fuser roll 44. A channel shaped base is provided for supporting fuser assembly 42 in the electrophotographic printing machine. Backup roll 46 is mounted rotatably on a pair of brackets secured to the channel shaped base by means of a right angle bracket. As shown, backup roll 46 is adapted to rotate in the direction of arrow 64. Preferably, backup roll 46 includes a rigid steel core 56 mounted rotatably on a shaft 68. An elastomeric surface or layer 70, preferably Viton, is entrained about core 66 and secured thereto.

A pair of brackets having a generally E-shaped configuration are provided for mounting fuser roll 44 rotatably in fuser assembly 42. A pair of ball bearings, one in each of the support brackets are provided for this purpose. Retaining rings secure the bearings in the brackets. A pair of end caps are secured to a hollow cylinder or core 72. The end caps have reduced end portions so as to be mounted in the bearings permitting fuser roll 44 to rotate in the direction of arrow 74. A heating element 76 is supported internally of cylinder 72 for providing thermal energy thereto. This raises the temperature of cylinder 72 to its operating temperature. Preferably, heating element 76 includes a quartz envelope having a tungsten resistance heating element enclosed therein. In this way, heating element 76 elevates the temperature of cylinder 72 to an operational temperature of from about 285° F to about 295° F. Preferably, cylinder 72 is fabricated from any suitable material capable of efficiently conducting heat to the external surface thereof. Suitable materials are aluminum and alloys thereof, steel, stainless steel, nickel and nickel alloys thereof, nickel plated copper, chromium plated copper, copper and alloys thereof. In operation, fuser roll 44 requires about 420 watts peak power with the average power being about 320 watts, and about 100 watts being provided for standby operation. Heating element 76 is supported internally of cylinder 72 by a pair of spring supports which are mounted in an insulating block secured to support brackets. The free ends of the spring supporting the elements are provided with a locating ball while the opposite end of the spring is disposed in contact with an electrical terminal to which electrical wires may be attached for applying electrical energy to heating element 76. The insulated blocks can be secured to support brackets in any suitable manner, i.e. by screws. The spring supports and terminals are, preferably, riveted to the insulating block.

Temperature detecting means 52 is in contact with cylinder 72. Temperature detecting means 52 includes supporting means, indicated generally by the reference numeral 78. Supporting means 78 includes a convex member 80 and a truncated spherical member 82. Planar surface 84 of spherical member 82 is in line contact with cylinder 72. Planar surface 84, in contact with cylinder 82, is coated with Teflon to provide lubrication reducing wear. Inasmuch as spherical member 82 has the spherical surface 86 thereof mounted movably in convex member 80, it is free to rotate in any direction. This insures that planar surface 84 is always in line contact with cylinder 72.

Referring now to FIG. 3, there is shown an elevational view of temperature detector 52. As shown thereat, supporting means 78 includes a convex member 80 and truncated spherical member 82 mounted rotatably therein. Spherical member 82 is truncated in order to provide a planar surface which is positioned in contact with cylinder 72 as shown in FIG. 2. Spherical surface 86 of spherical member 82 is mounted in the convex portion of convex member 80. In this manner, spherical member 82 may be free to rotate in any direction, i.e. it is gimbled to have three degrees of freedom, so as to insure that planar surface 84 remains continuously in line contact with cylinder 72. Lead wire 88 extends interiorly of spherical member 82 to electrically connect the thermistor mounted therein with electrical socket 90. Socket 90 is connected to an electrical circuit that compares the measured or detected temperature of cylinder 72 with reference signal to determine whether additional or less power is required to heating element 76. In this way, the temperature of cylinder 72 is maintained substantially constant.

Referring now to FIG. 4, there is shown a sectional view of supporting means 78 and temperature detecting means 52 associated therewith. Spherical member 82 is hollow having thermistor 92 cemented to and in contact with the interior wall of planar surface 84. Convex member 80 supports spherical member 82 pivotably. This enables spherical member 82 to pivot to any position insuring that planar surface 82 remains in line contact with cylinder 72. In this way, thermistor 92 positioned on the center line of planar surface 84, measures the temperature of cylinder 72. This measurement is achieved by thermal conduction through the metallic planar surface 84. Spherical member 82 is made from a cantilever spring to resiliently urge thermistor 92 into contact with planar surface 84. Electrical wire 88 connects thermistor 92 with electrical socket 90, as heretofore described.

In recapitulation, it is apparent, that, pursuant to the features of the present invention, the temperature detector is arranged to have three degrees of freedom so that alignment thereof is not critical. With these degrees of freedom, the temperature sensor may pivot to any position to remain continuously in contact with the rotating fuser cylinder. This insures that the temperature of the cylinder is continuously monitored and that there is no difficulty in aligning the thermistor thereto. In this way, the fuser roll temperature is controlled so as to optimize the fusing of the toner onto the sheet of support material insuring high quality copies from the electrophotographic printing machine.

It is, therefore, evident that there has been provided, in accordance with the present invention, an apparatus for permanently affixing heat settable particles to a sheet wherein the temperature thereof is continuously controlled. The apparatus of the present invention fully satisfies the objects, aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An apparatus for permanently affixing heat settable particles to a sheet, including:
    a fuser member;
    a backup member cooperating with said fuser member to define a nip through which the sheet having the particles thereon passes;
    means for heating at least said fuser member to a temperature sufficient to permanently affix the particles to the sheet;
    a convex member;
    a truncated spherical member having the arcuate portion thereof mounted movably in said convex member with the planar portion thereof substantially in line contact with said fuser member; and
    a thermistor mounted interiorly of said spherical member contacting the planar portion thereof, said spherical member resiliently urging the planar portion thereof having said thermistor mounted interiorly thereon into contact with said fuser member to detect the temperature thereof.

2. An apparatus as recited in claim 1, wherein:
    said fuser member includes a first roll; and
    said backup member includes a second roll contacting said first roll to define the nip through which the sheet passes.

3. An electrostatographic printing machine of the type having a heated fuser member operatively associated with a backup member with a sheet of support material having toner particles thereon passing therethrough, wherein the improvement includes:
    a convex member;
    a truncated spherical member having the arcuate portion thereof mounted movably in said convex member with the planar portion thereof substantially in line contact with the fuser member; and
    a thermistor mounted interiorly of said spherical member contacting the planar portion thereof, said spherical member resiliently urging the planar portion thereof having said thermistor mounted interiorly thereon into contact with the fuser member to detect the temperature thereof.

4. A printing machine as recited in claim 3, wherein:
    the fuser member includes a first roll; and
    the backup member includes a second roll contacting said first roll to define the nip through which the sheet passes.

* * * * *